US 10,562,113 B2

(12) United States Patent
Lee

(10) Patent No.: US 10,562,113 B2
(45) Date of Patent: Feb. 18, 2020

(54) CHANNEL BENDER

(71) Applicant: Seoul Laser Dieboard System Co., Ltd., San Diego, CA (US)

(72) Inventor: Sang Moo Lee, Seoul (KR)

(73) Assignee: SEOUL LASER DIEBOARD SYSTEM CO. LTD., Foothill Ranch, CA (US)

( * ) Notice: Subject to any disclaimer, the term of this patent is extended or adjusted under 35 U.S.C. 154(b) by 862 days.

(21) Appl. No.: 15/094,867

(22) Filed: Apr. 8, 2016

(65) Prior Publication Data

US 2016/0297015 A1 Oct. 13, 2016

Related U.S. Application Data

(60) Provisional application No. 62/144,808, filed on Apr. 8, 2015.

(51) Int. Cl.
| | | |
|---|---|---|
| *B23D 37/10* | (2006.01) | |
| *B21D 7/00* | (2006.01) | |
| *B21D 28/02* | (2006.01) | |
| *B21D 11/08* | (2006.01) | |

(52) U.S. Cl.
CPC .............. *B23D 37/10* (2013.01); *B21D 7/00* (2013.01); *B21D 11/08* (2013.01); *B21D 28/02* (2013.01)

(58) Field of Classification Search
CPC . B21D 5/00; B21D 5/045; B21D 5/16; B21D 7/02; B21D 7/021; B21D 7/024; B21D 7/028; B21D 7/03; B21D 7/04; B21D 11/08; B21D 11/085; B21D 11/20; B21D 28/02; B21D 28/243; B21D 28/26; B21D 31/043; B21D 31/046; B21D 35/00; B23D 1/10; B23D 3/02; B23D 37/02; B23D 37/04; B23D 37/08; B23D 37/10; B23D 41/04; B23D 41/08; B23D 43/02; B23D 43/06

See application file for complete search history.

(56) References Cited

U.S. PATENT DOCUMENTS

| | | | | |
|---|---|---|---|---|
| 5,463,890 | A * | 11/1995 | Tachibana | B21D 7/02 |
| | | | | 72/294 |
| 6,367,302 | B1 * | 4/2002 | Park | B21D 11/10 |
| | | | | 72/294 |
| 2012/0324705 | A1 | 12/2012 | Lim et al. | |

FOREIGN PATENT DOCUMENTS

| | | |
|---|---|---|
| WO | 98/17413 A2 | 4/1998 |
| WO | 2009061742 A2 | 5/2009 |
| WO | 2009061742 A3 | 5/2009 |
| WO | 2012149432 A1 | 11/2012 |

OTHER PUBLICATIONS

Extended European Search Report for European patent application No. 16164513.0 dated Aug. 1, 2016 in 9 pages.

* cited by examiner

*Primary Examiner* — Peter Dungba Vo
*Assistant Examiner* — Joshua D Anderson
(74) *Attorney, Agent, or Firm* — Procopio, Cory, Hargreaves & Savitch LLP

(57) ABSTRACT

A channel bender including: a feeding unit configured to feed and guide a channel material into the channel bender; at least one broaching unit configured to perform at least one of bite broaching and wheeled broaching on the channel material to make at least one broaching mark; and a bending unit configured to bend the channel material that include the at least one broaching mark.

12 Claims, 24 Drawing Sheets

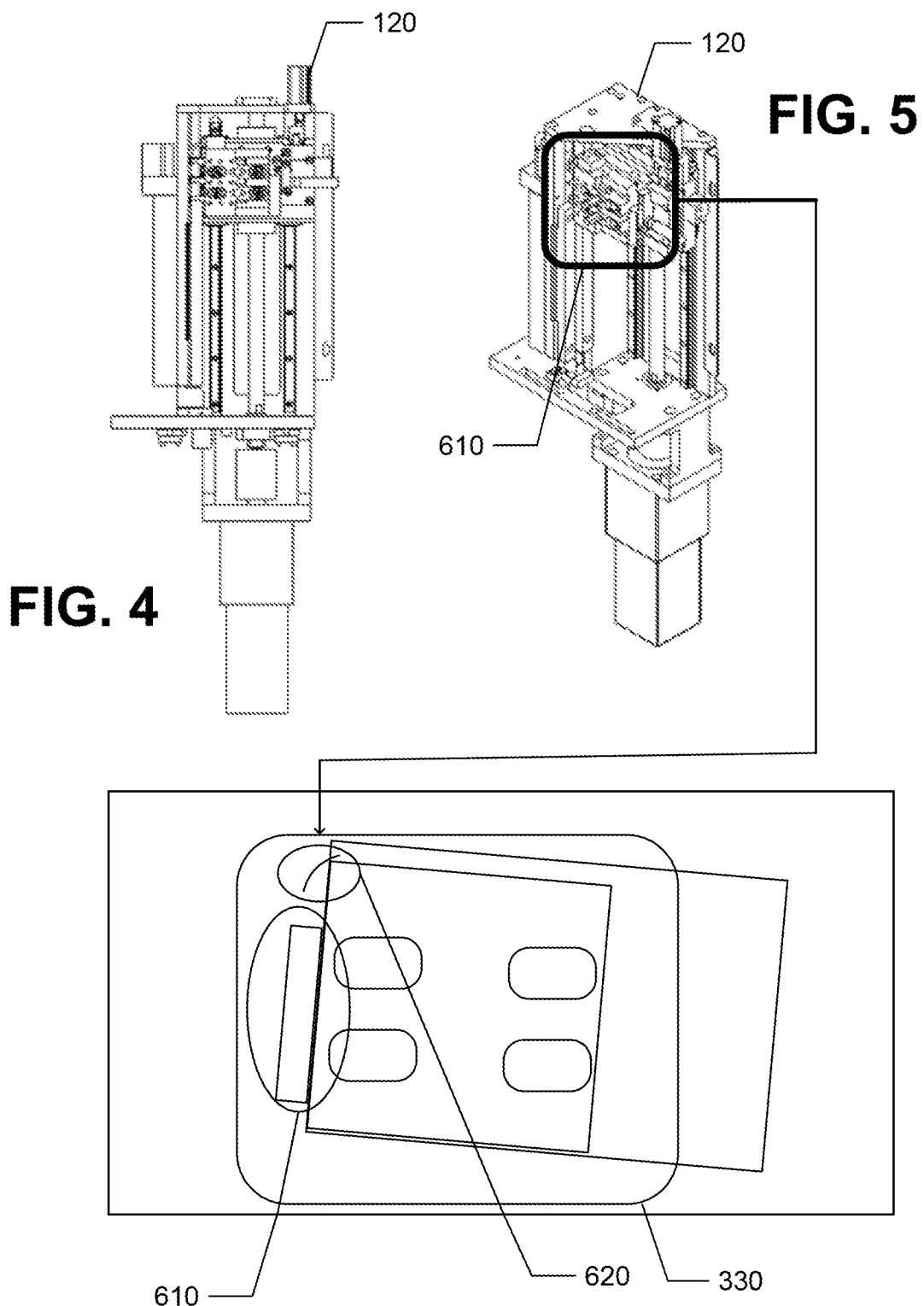

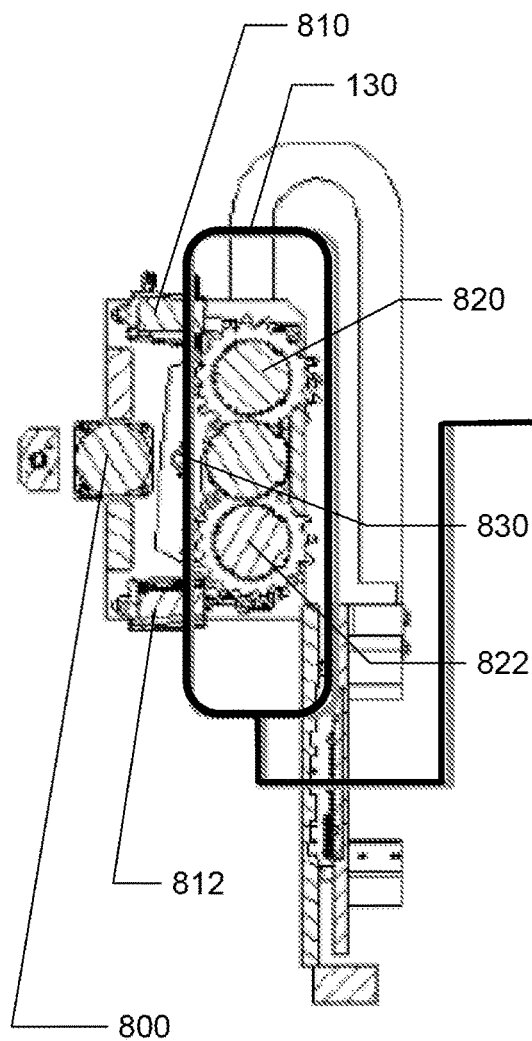 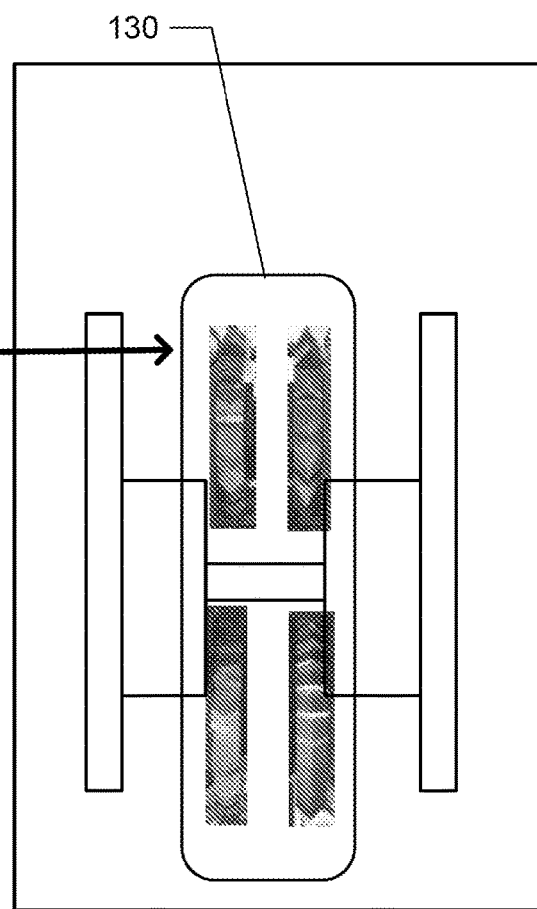
FIG. 8A  FIG. 8B

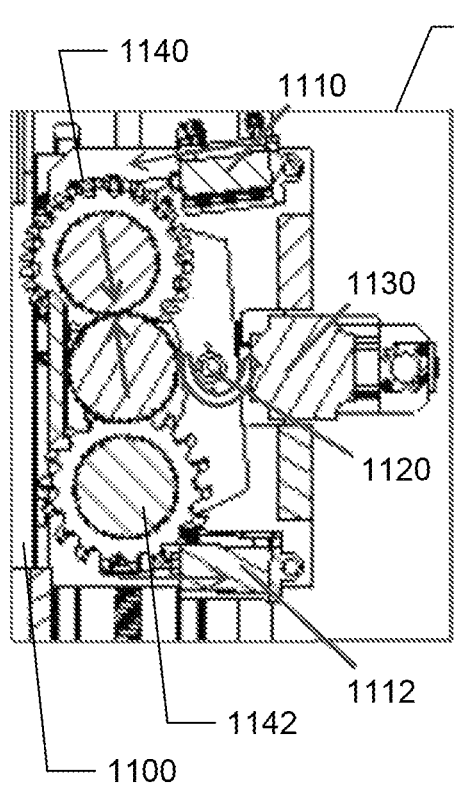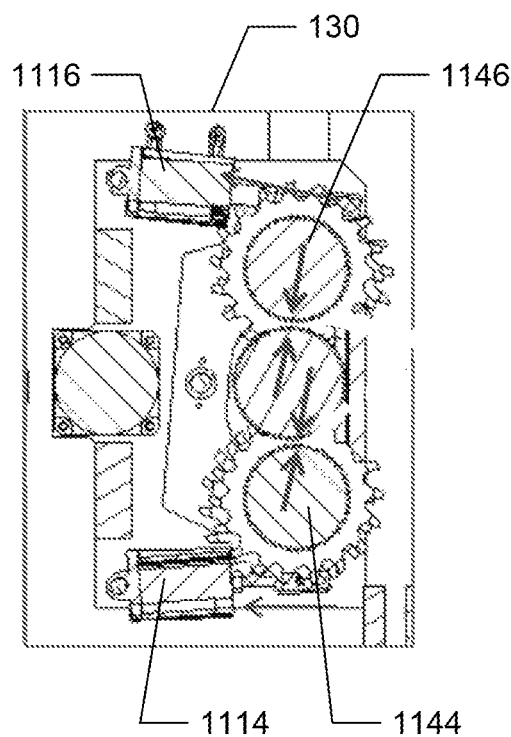
FIG. 11A  FIG. 11B

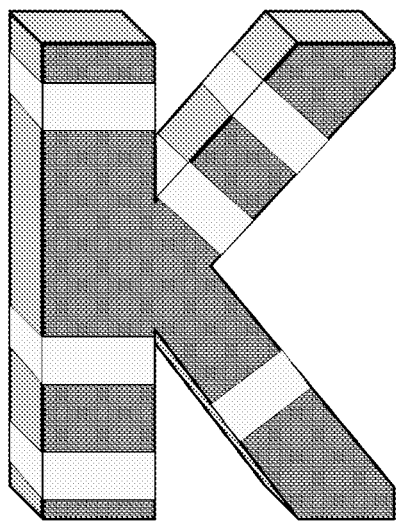 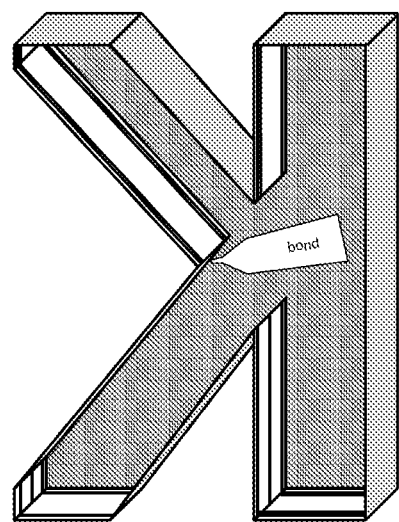
FIG. 28C  FIG. 28D
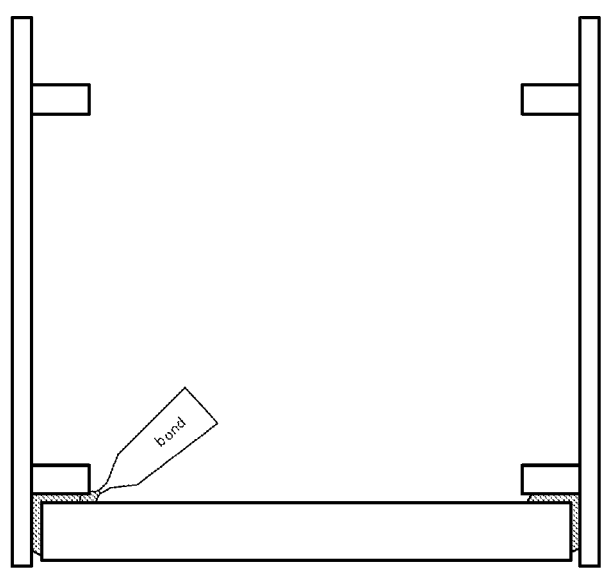
FIG. 28E

CHANNEL BENDER

CROSS-REFERENCE TO RELATED APPLICATIONS

This application claims the benefit of priority under 35 U.S.C. § 119(e) of U.S. Provisional Patent Application No. 62/144,808, filed Apr. 8, 2015, entitled "Channel Bender."

BACKGROUND

Technological Field

The present disclosure relates to channel benders, and more specifically, to new concept channel benders that make bending of the channel material easy.

Related Art

Channel benders are used to manufacture channel letters from channel materials. However, new concept channel benders that make bending of the channel material easy would be desirable.

BRIEF DESCRIPTION OF THE DRAWINGS

The details of the present disclosure, both as to its structure and operation, may be gleaned in part by study of the accompanying drawings.

FIG. 4 is a side view of the first broaching unit in accordance with one implementation of the present disclosure;

FIG. 5 is a perspective view of the first broaching unit showing the broaching tool;

FIG. 6 is a side view of the broaching tool configured within the first broaching unit in accordance with one implementation of the present disclosure;

FIG. 8A is a cross-sectional view (along cross section B-B shown in FIG. 7) of the second broaching unit configured as a wheeled broaching unit in accordance with one implementation the present disclosure;

FIG. 8B is a front view of the second broaching unit configured as a wheeled broaching unit in accordance with one implementation the present disclosure;

FIG. 11A is a detailed cross-sectional view of the second broaching unit in accordance with another implementation of the present disclosure;

FIG. 11B shows the second broaching unit in a neutralization position;

FIG. 28A to FIG. 28E show a process of making a channel letter "K" using a profile after the channel bender was used to bend the profile into the letter shape.

DETAILED DESCRIPTION

Figure 1:
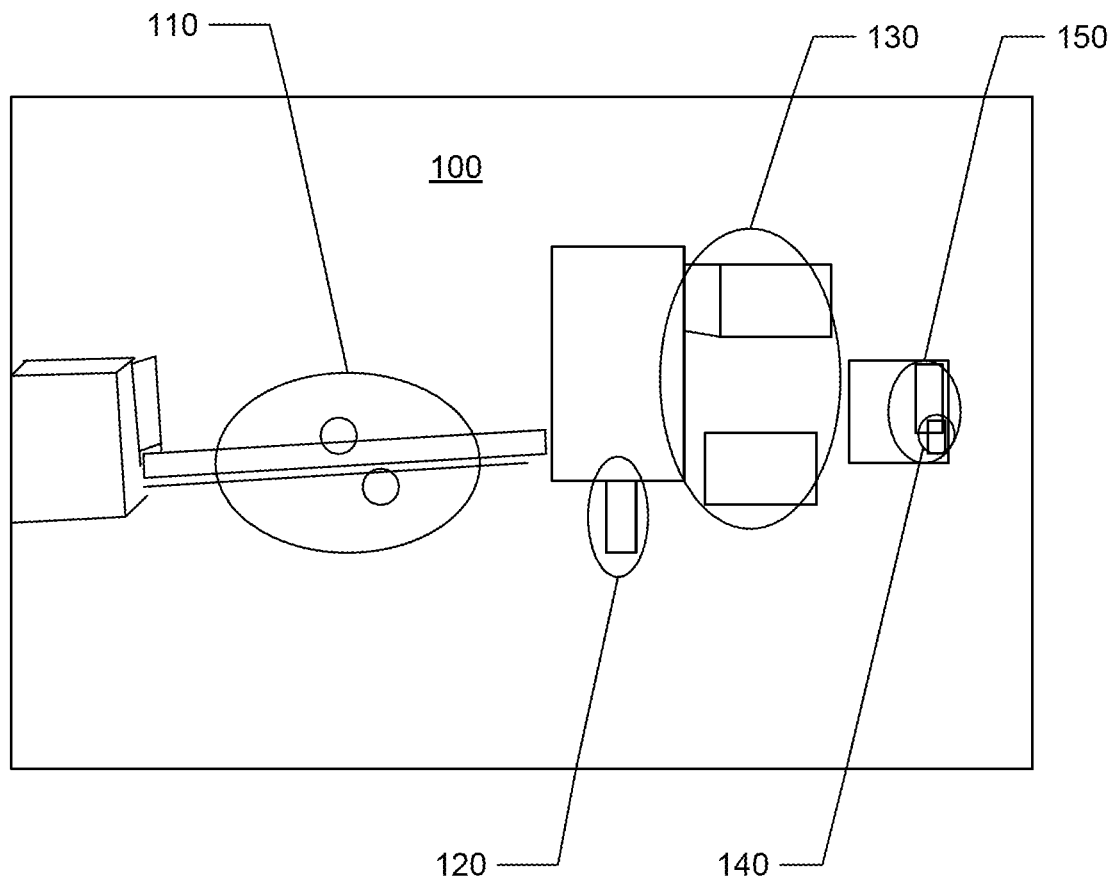
FIG. 1 is a perspective view of a channel bender in accordance with one implementation of the present disclosure.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description. As used herein, like reference numerals refer to like features throughout the written description.

Apparatus, devices, and methods for a channel bender are described in which the bender includes, among others, a feeding unit, broaching units, a bending unit, and a cutting unit. These units of the channel bender provide the bending of the rule (or profile) easy. There are numerous advantages to using the channel bender as explained below. As described herein, a "rule" may generally refer to a flat metallic strip, while a "profile" as used herein may generally refer to the rule having a rib.

Examples of implementations are shown on the following pages. All features of each example are not necessarily required in a particular implementation. Other solutions can also be used (off the shelf or custom). Suggestions for requirements refer to a particular implementation and not necessarily all implementations.

Additional variations and implementations are also possible. Accordingly, the technology is not limited only to the specific examples noted herein.

FIG. 1 is a perspective view of a channel bender 100 in accordance with one implementation of the present disclosure. In the illustrated implementation of FIG. 1, the channel bender 100 includes a feeding unit 110, a first broaching unit 120, a second broaching unit 130, a bending unit 140, and a cutting unit 150. The details of the units of the channel bender 100 will be described in detail below.

The feeding Unit 110 includes grippers or rollers which are used to feed the rule or profile material. This unit 110 also includes a nozzle assembly which operates in conjunction with the bending unit. The first broaching unit 120 is configured to perform bite broaching for strong materials such as stainless steel, brass, etc. The second broaching unit 130 configured to perform wheeled broaching using at least one broaching wheel for less strong material (weaker than the material used for the first broaching unit 120) such as aluminum, etc. The bending unit 140 is configured to bend the material such as rule, profile, etc. The cutting unit 150 is configured to cut the material for finalizing a channel letter. A "channel letter" as used herein can refer generally to letters, numbers, or other shapes that can be formed using the profiles.

Figure 2:
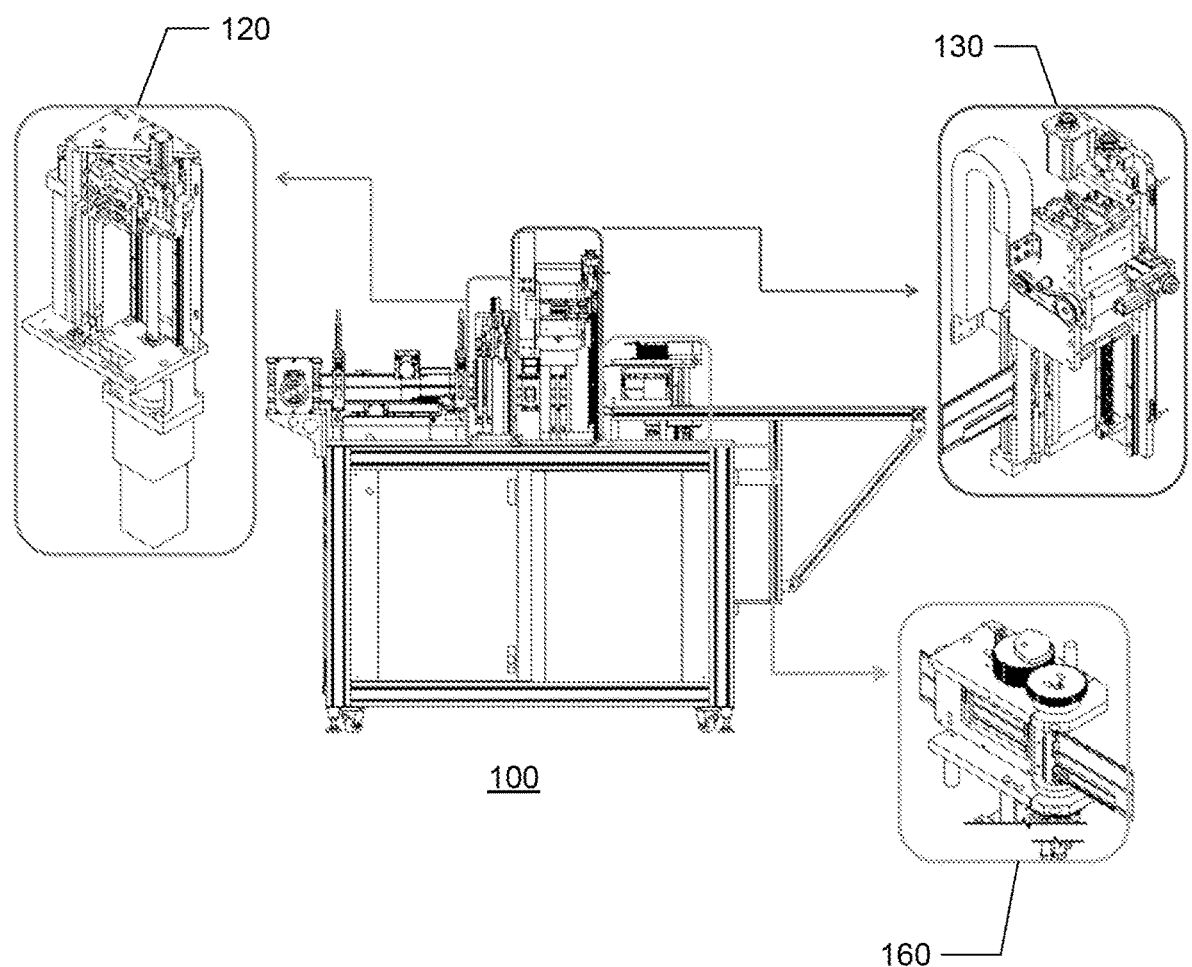
FIG. 2 is a front view of the channel bender in accordance with another implementation of the present disclosure.

FIG. 2 is a front view of the channel bender 100 in accordance with another implementation of the present disclosure. The first broaching unit 120, the second broaching unit 130, and the bending/cutting unit (which is configured as an integrated unit 160) are shown in detail. The detailed descriptions of each unit including the integration of the bending unit 140 and the cutting unit 150 are presented below. In the illustrated implementation of FIG. 2, the first broaching unit 120 is configured as a bite broaching unit and the second broaching unit 130 is configured as a wheeled broaching unit.

Figure 3A:
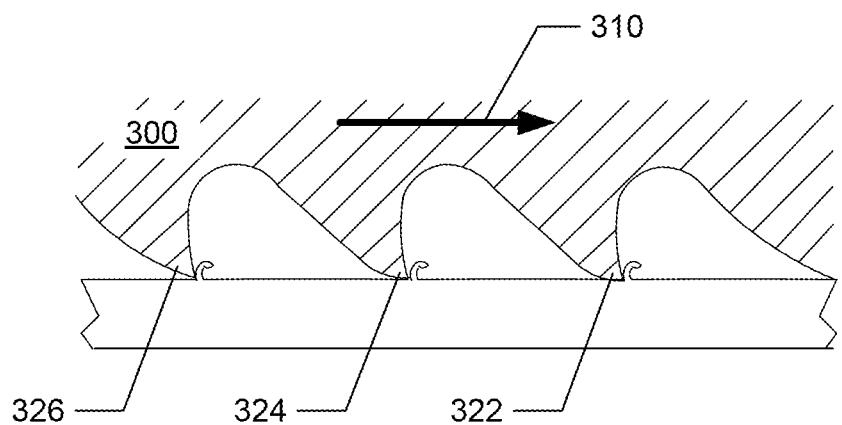
FIG. 3A shows a detailed view of the bite broaching using a broaching tool configured within the first broaching unit in accordance with one implementation of the present disclosure.

Broaching is a machining process that pushes or pulls a tool (called a broach or broaching unit) over or through the surface being machined. FIG. 3A shows a detailed view of the bite broaching using a broaching tool 300 configured within the first broaching unit 120 in accordance with one implementation of the present disclosure. As described above, the first broaching unit 120 is configured to perform the bite broaching generally for strong materials such as stainless steel, brass, and other similar materials.

FIG. 3A shows the broaching tool 300 having a series of teeth 322, 324, 326 arranged that they cut the material when the broaching tool 300 is given a linear movement 310. Each tooth 322, 324, 326 of the broaching tool 300 removes a small amount of material.

Figure 3B:
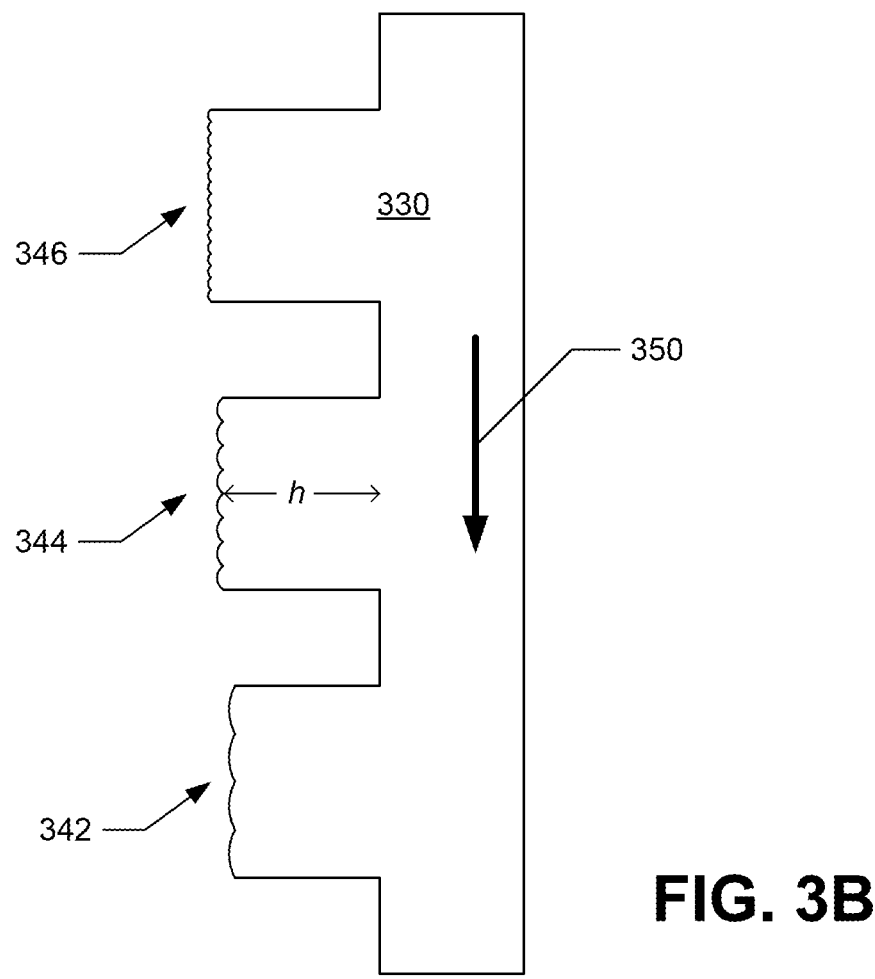
FIG. 3B shows a detailed view of the bite broaching using a broaching tool configured within the first broaching unit in accordance with another implementation of the present disclosure.

FIG. 3B shows a detailed view of the bite broaching using a broaching tool 330 configured within the first broaching unit 120 in accordance with another implementation of the present disclosure. The broaching tool 330 includes three sections 342, 344, 346 with each section having a different teeth configuration which progressively increases in height (h) and moving in direction 350. That is, the first section 342 has the smallest height, while the third section 346 has the largest height. The three sections 342, 344, 346 include the first section 342 configured with roughing teeth and shallow height for initial preparation, the second section 344 configured with semi-finishing teeth, and the third section 346 configured with finishing teeth. Each section of teeth of the broaching tool 330 removes a small amount of material. It should be noted that although three sections are shown in FIGS. 3A and 3B, any number of sections (e.g., at least one section) with different teeth configurations can be configured for the broaching tool 330. It should also be noted that the configurations of the sections can be reversed (e.g., the first section in the direction of the movement 350 can be section 344 and then section 342 and then section 346).

FIG. 4 through FIG. 6 show different views of the first broaching unit 120 in accordance with one implementation of the present disclosure. FIG. 4 is a side view of the first broaching unit 120. FIG. 5 is a perspective view of the first broaching unit 120 showing the broaching tool 330. FIG. 6 is a side view of the broaching tool 330 configured within the first broaching unit 120 in accordance with one implementation of the present disclosure.

In the illustrated implementation of FIG. 6, the broaching tool 330 includes the part 610 described in conjunction with FIG. 3B. Thus, when the broaching tool 330 moves down, the ends of the three part 610 provide progressively increasing bite into the rule or profile to make the broaching mark. A nozzle 620 configured next to the last section of the part 610 is configured to blow air into the broaching mark to blow away any leftover bits of material in the broaching mark.

FIG. 7 through FIG. 17 show various implementations of the second broaching unit 130 configured as a wheeled broaching unit in accordance with one implementation of the present disclosure. As described above, the second broaching unit 130 is configured to perform the wheeled broaching generally for materials that are weaker than materials used for bite broaching. Thus, in the second broaching unit (e.g., 700) at least one broaching wheel is used for broaching less strong material (than the material for bite broaching) such as aluminum and other similar material.

Figure 7:
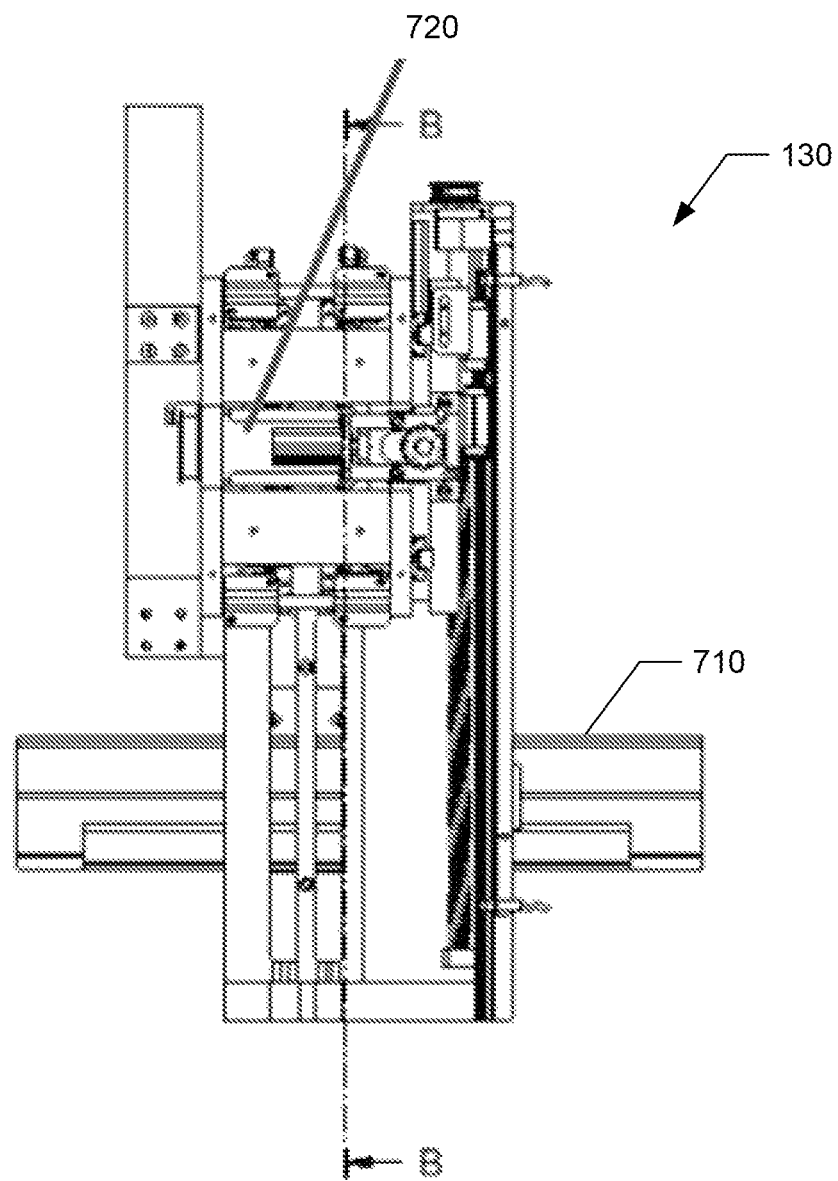
FIG. 7 is a rear view of the second broaching unit configured as a wheeled broaching unit in accordance with one implementation the present disclosure.

FIG. 7 is a rear view of the second broaching unit 130 configured as a wheeled broaching unit in accordance with one implementation the present disclosure. In the illustrated implementation of FIG. 7, the second broaching unit 130 includes a rotary motor 720 configured to engage a selected motor to activate one of the wheels for wheeled broaching. FIG. 7 also shows the profile 710 on which the broaching mark is made.

FIG. 8A is a cross-sectional view (along cross section B-B shown in FIG. 7) and FIG. 8B is a front view of the second broaching unit 130 configured as a wheeled broaching unit in accordance with one implementation the present disclosure. FIG. 8B shows four wheels with each wheel configured for a different broaching angle, which, in one implementation, can be configured as 60, 90, 120, and 165 degrees. FIG. 8A also shows a rotary motor 800, an index axis 830, cylinders 810, 812, and wheels 820, 822. It should be noted that although four wheels are shown in FIG. 8B, any number of wheels (e.g., at least one wheel) can be configured for the second broaching unit 130.

Figure 9:
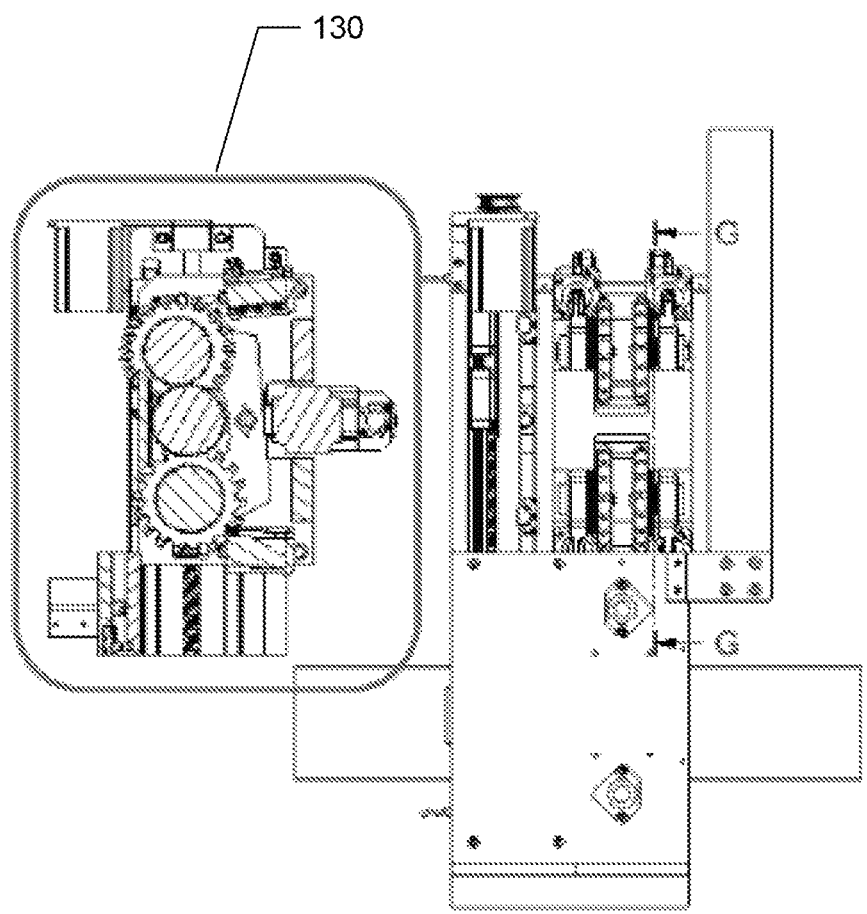
FIG. 9 is a front view of the second broaching unit configured as a wheeled broaching unit in accordance with one implementation the present disclosure.

FIG. 9 is a front view of the second broaching unit 130 configured as a wheeled broaching unit in accordance with one implementation the present disclosure.

Figure 10:
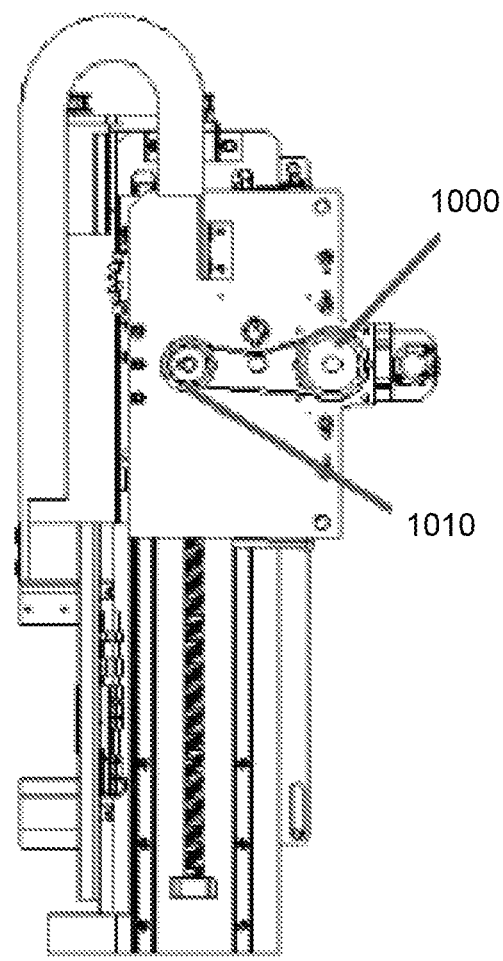
FIG. 10 is a cross-sectional view (along cross section G-G shown in FIG. 9) of the second broaching unit configured as a wheeled broaching unit in accordance with one implementation the present disclosure.

FIG. 10 is a cross-sectional view (along cross section G-G shown in FIG. 9) of the second broaching unit configured as a wheeled broaching unit in accordance with one implementation the present disclosure. FIG. 10 shows the rotary motor 1000 coupled to the index axis 1010.

FIG. 11A is a detailed cross-sectional view of the second broaching unit 130 in accordance with another implementation of the present disclosure. In the illustrated implementation of FIG. 11A, when one 1140 of the wheels 1140, 1142, 1144, 1146 is selected by tilting one 1110 of the index cylinders 1110, 1112, 1114, 1116 toward the rule or profile 1100 that is to be broached, the rotary motor 1130 engages the tilted wheel 1140 to spin the wheel 1140 about the index axis 1120. FIG. 11B shows the second broaching unit 130 in a neutralization position.

Figure 12:
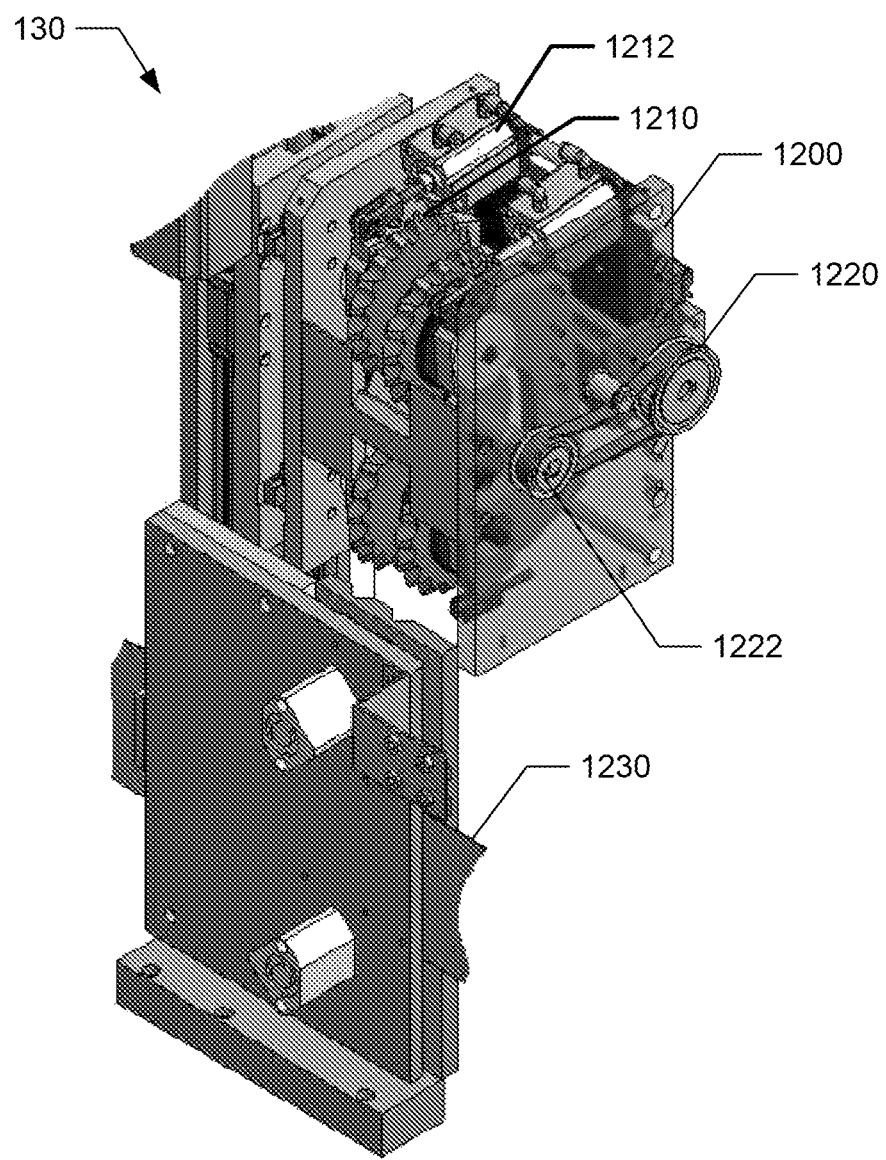
FIG. 12 is another front perspective view of the second broaching unit in accordance with one implementation of the present disclosure.

FIG. 12 is another front perspective view of the second broaching unit 130 in accordance with one implementation of the present disclosure. This view includes a surface 1200 that is made transparent to allow internal connections to be visible. FIG. 12 shows that when one (e.g., 1210) of the wheels is selected by tilting one (e.g., 1212) of the index cylinders toward the rule or profile 1230 that is to be broached, the rotary motor 1220 engages the tilted wheel 1210 to spin the wheel 1210 about the index axis 1222.

Figure 13:
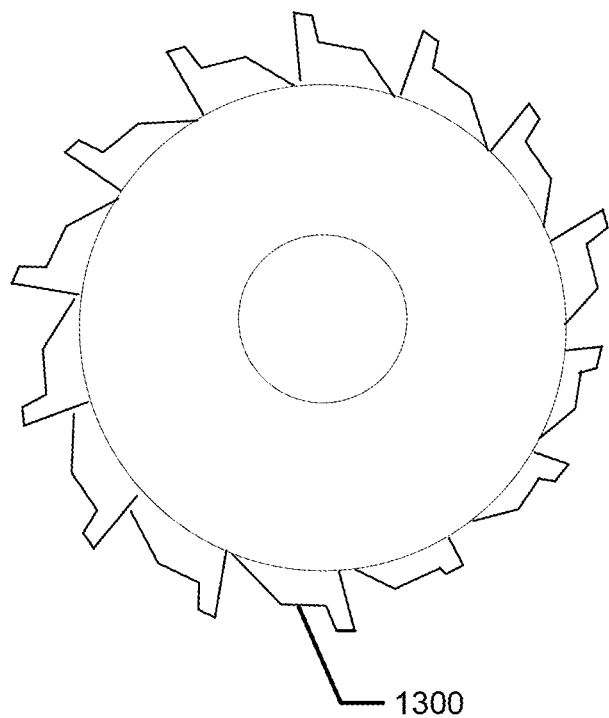
FIG. 13 and FIG. 14 show example wheel used for the second broaching unit to perform wheeled broaching.
Figure 14:
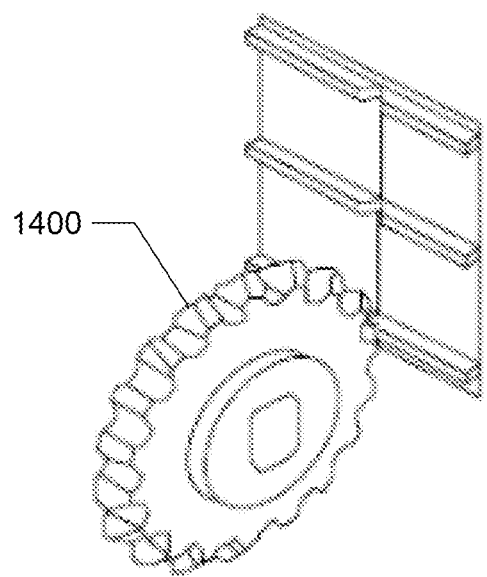

FIG. 13 and FIG. 14 show example wheel used for the second broaching unit 130 to perform wheeled broaching. As described above, each wheel of the at least one wheels is configured with a different broaching angle 1300 or 1400.

Figure 15:
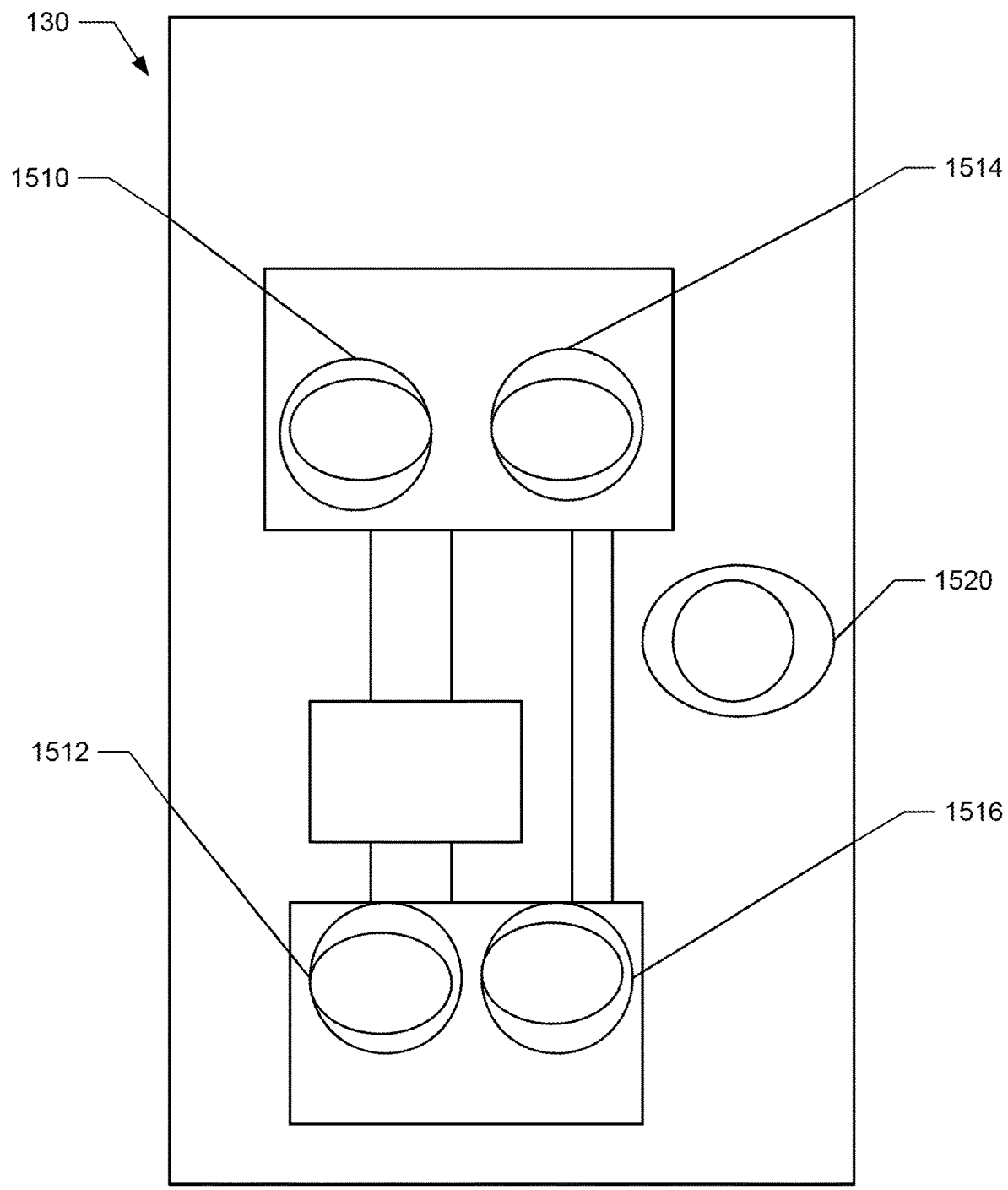
FIG. 15 is a rear view of the second broaching unit with wires connected in accordance with one implementation of the present disclosure.

FIG. 15 is a rear view of the second broaching unit 130 with wires connected in accordance with one implementation of the present disclosure. FIG. 15 shows the positions 1510, 1512, 1514, 1516 where the four index cylinders for the four wheels are disposed. FIG. 15 also shows a depth control unit 1520 which is programmed to control the depth of the second broaching unit 130 with respect to the rule or profile.

Figure 16:
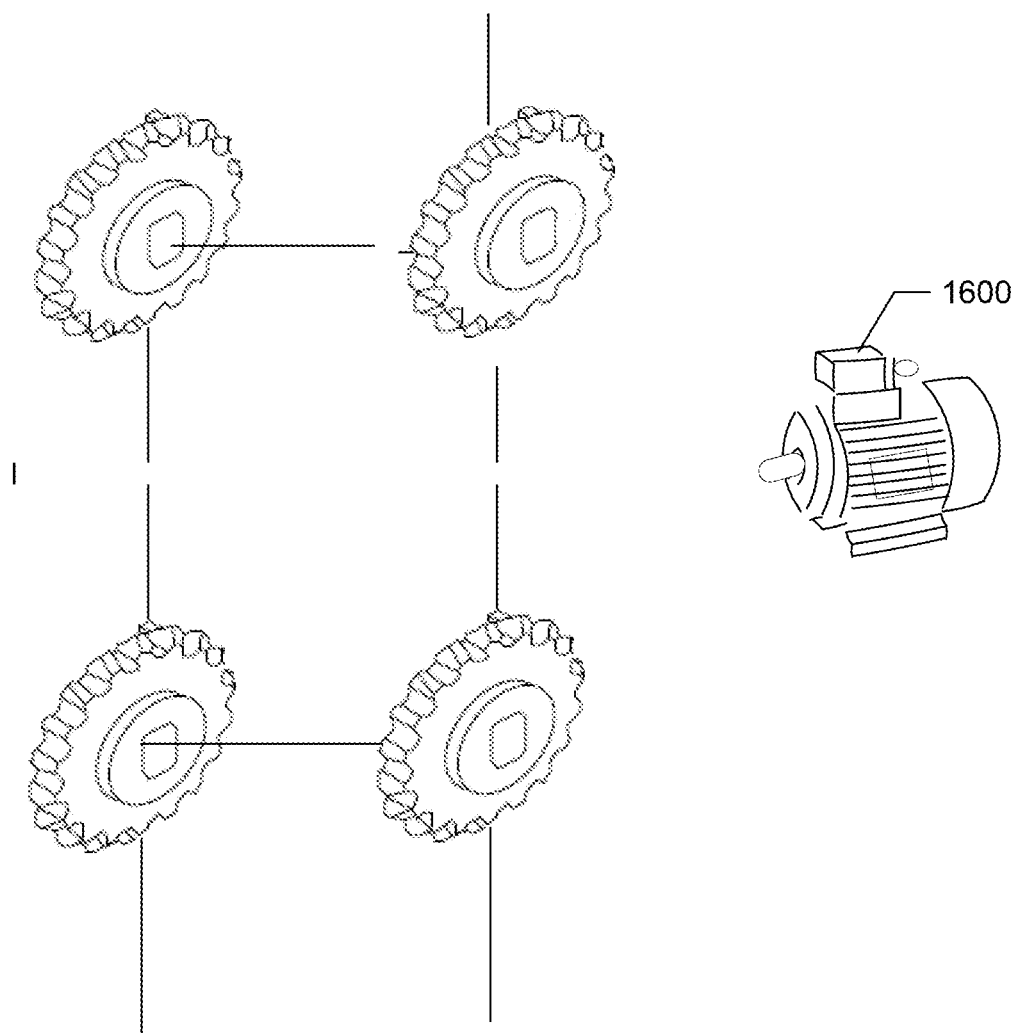
FIG. 16 is a graphical representation of the second broaching unit in accordance with one implementation of the present disclosure.

FIG. 16 is a graphical representation of the second broaching unit 130 in accordance with one implementation of the present disclosure. In the illustrated implementation of FIG. 16, four wheels are used to broach the surface of a rule or profile. One wheel is selected by tilting one of the index cylinders (not shown). Once the selected wheel is tilted, the rotary motor 1600 engages the tilted wheel to spin the wheel to broach the surface.

Figure 17:
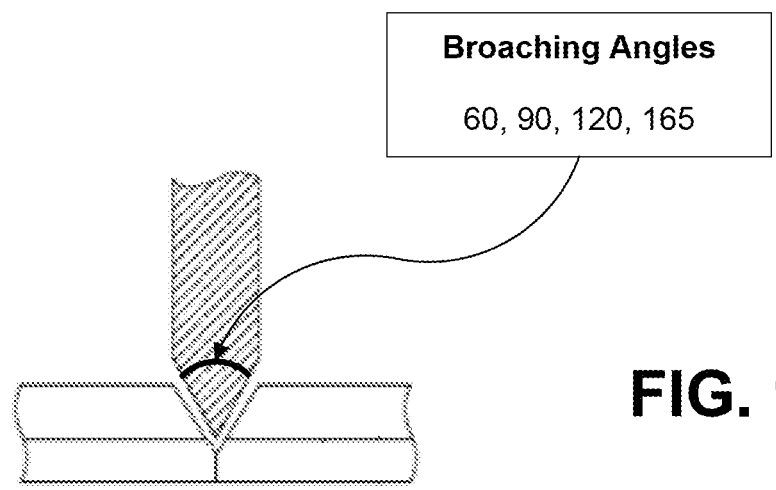
FIG. 17 shows a wheel with a broaching angle identified, which, in one implementation, can be configured as 60, 90, 120, and 165 degrees.

FIG. 17 shows a wheel with a broaching angle identified, which, in one implementation, can be configured as 60, 90, 120, and 165 degrees.

Figure 18:
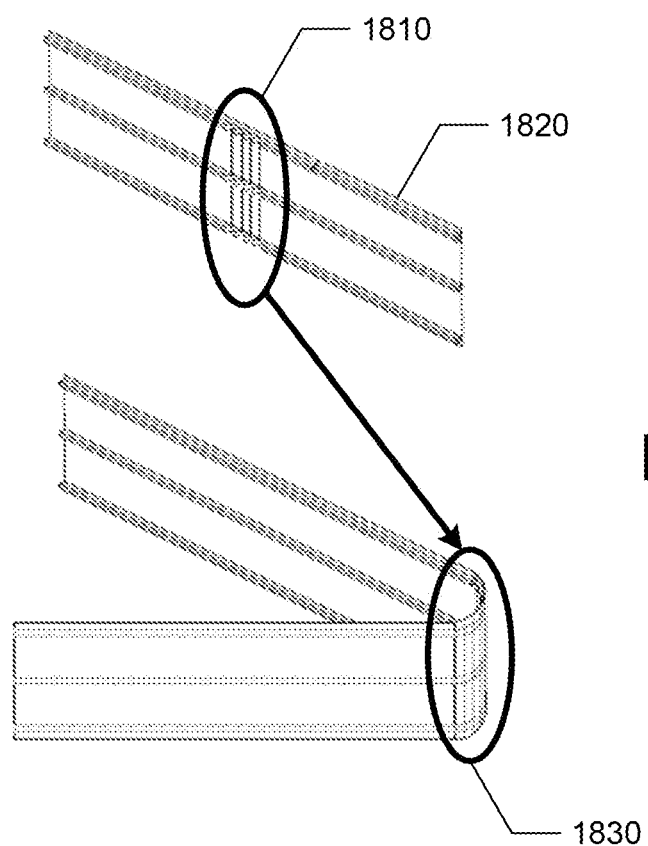
FIG. 18 shows advantages of making multiple broaching angles and multiple broaching marks in accordance with one implementation of the present disclosure.

FIG. 18 shows advantages of making multiple broaching angles and multiple broaching marks in accordance with one implementation of the present disclosure. For example, illustrated implementation of FIG. 18 shows four broaching marks 1810 on the profile 1820, which enables the profile to be bent into multiple bending angles 1830. Further, each broaching mark of the four broaching marks 1810 can have different angle to allow the profile to be bent into a variety of angles with smooth curves.

Figure 19A:
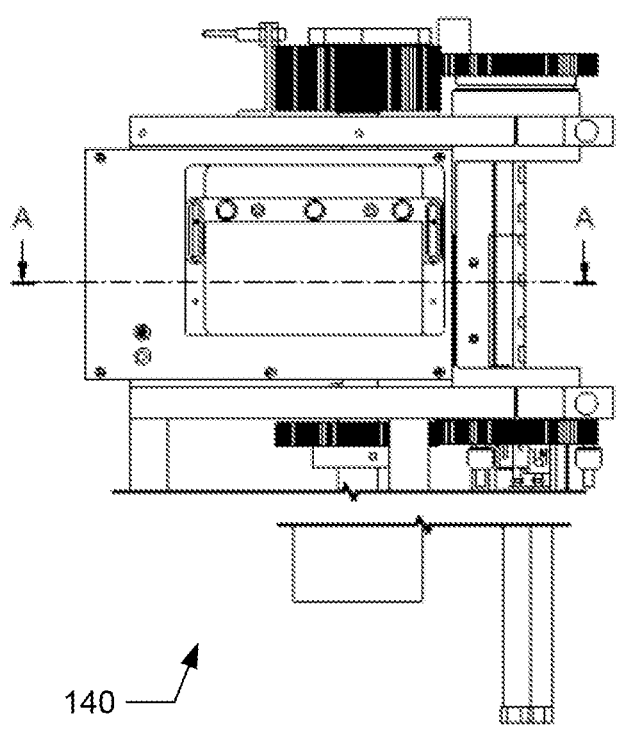
FIG. 19A is a side view of the bending unit in accordance with one implementation of the present disclosure.
Figure 19B:
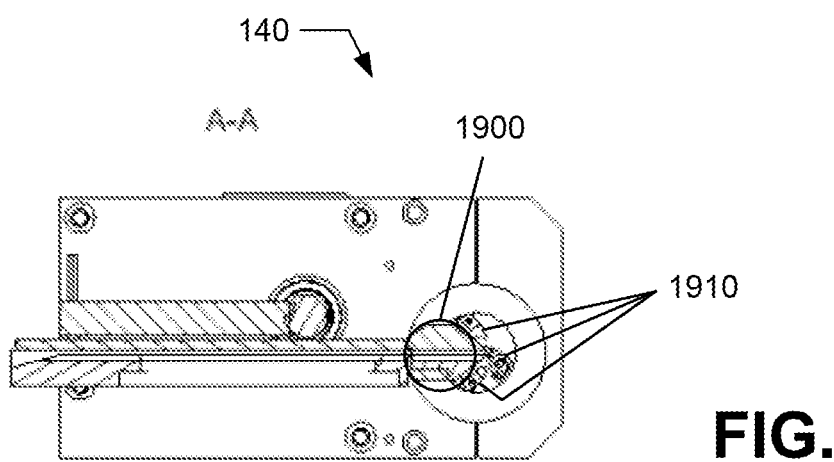
FIG. 19B is a cross-sectional view of the bending unit (along cross section A-A shown in FIG. 19A)

FIG. 19A is a side view of the bending unit 140 in accordance with one implementation of the present disclosure. FIG. 19B is a cross-sectional view of the bending unit 140 (along cross section A-A shown in FIG. 19A). The bending unit 140 includes two parts, a nozzle part 1900 and a finger/folding part 1910. The nozzle part 1900 is configured to couple to the far end of the feeding unit (not shown) and guides the rule or profile so that it can be bent or folded by the finger/folding part 1910. In one implementation, the nozzle part 1900 includes an interchangeable assembly, which can be swapped out depending on the properties of the material to be bent. The finger/folding part 1910 is configured to be spaced a predetermined distance away from the tip of the nozzle part and includes at least one finger or folding part. Typically, there are between two to four fingers or folding members.

Figure 20:
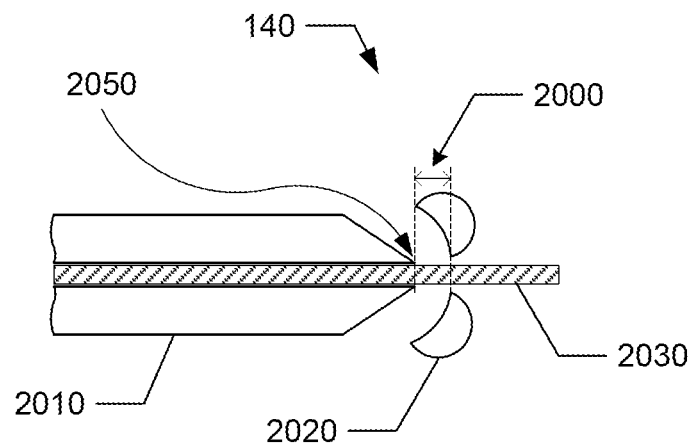
FIG. 20 is a detailed top view of the bending unit in accordance with one implementation of the present disclosure.

FIG. 20 is a detailed top view of the bending unit 140 in accordance with one implementation of the present disclosure. In the illustrated implementation of FIG. 20, the nozzle part 2010 is configured for a thin material 2030 (profile, rule, etc.), in which case, the finger part 2020 is positioned close (e.g., a small value for distance 2000 compared to distance 2002 in FIG. 21) to the tip 2050 of the nozzle part 2010 to perform very accurate bending.

Figure 21:
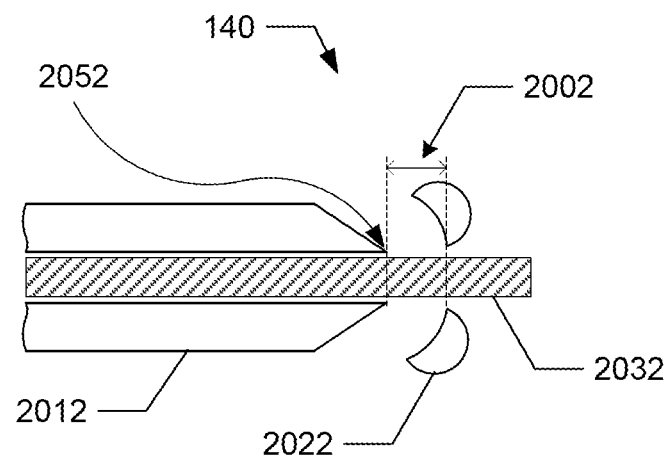
FIG. 21 is a detailed top view of the bending unit in accordance with another implementation of the present disclosure.

FIG. 21 is a detailed top view of the bending unit 140 in accordance with another implementation of the present disclosure. In FIG. 21, the nozzle part 2012 is configured for a thick material 2032 (profile, rule, etc.), in which case, the finger part 2022 is positioned farther away (e.g., a larger value for distance 2002 compared to distance 2000 in FIG. 20) from the tip 2052 of the nozzle part 2012 than in the case of the thin material 2030. This lengthening of the distance 2002 (between the tip 2052 of the nozzle part 2012 and the finger part 2022) is desirable for accurate bending as well as for preventing the breaking of the finger. In some implementations, for materials of different thickness, rather than replacing the entire nozzle part, the left and right sides of the nozzle can be adjusted to accept the material.

Figure 22A:
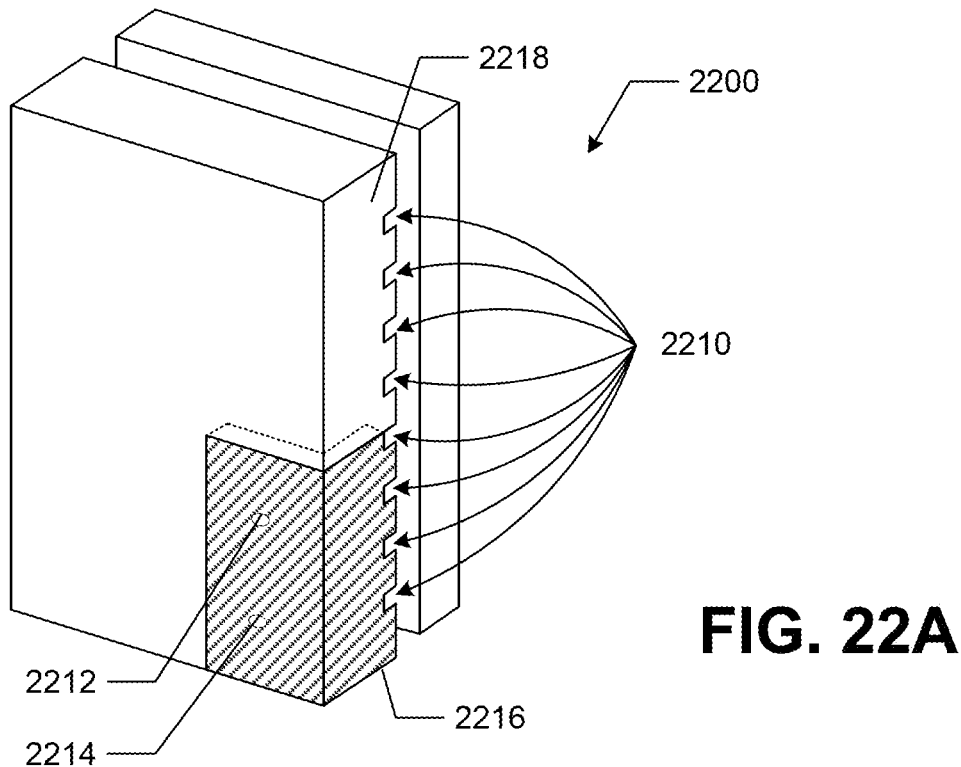
FIG. 22A is a perspective view of a nozzle part of the bending unit in accordance with one implementation of the present disclosure.

FIG. 22A is a perspective view of a nozzle part 2200 of the bending unit 140 in accordance with one implementation of the present disclosure. FIG. 22A shows cuts 2210 on the nozzle part 2200 made to accept the ribs (e.g., ribs 2230, 2232, 2234 in FIG. 22B) of a profile (e.g., profile 2220 in FIG. 22B). Since a profile can have ribs placed differently, the lower portion 2216 is configured to be separable by unscrewing the bolts 2212, 2214 and replacing the lower portion 2216 with differently configured lower portion. The upper portion 2218 is configured to be fixed because the cuts in the upper portion 2218 generally match the positions of the ribs on a standard profile.

Figure 22B:
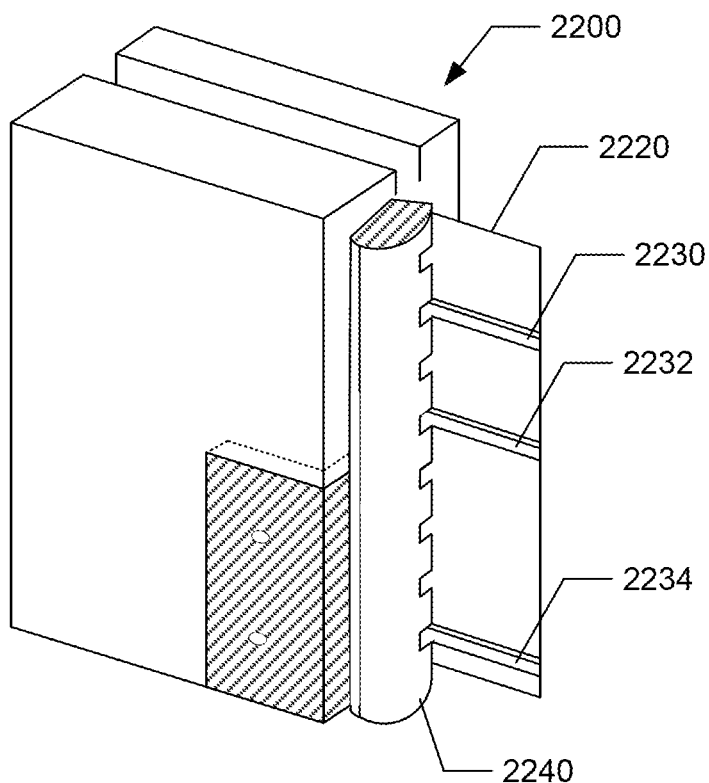
FIG. 22B shows corresponding cuts (corresponding to the cuts made on the nozzle part) made on the finger/folding part.

FIG. 22B shows corresponding cuts (corresponding to the cuts 2210 made on the nozzle part) made on the finger/folding part 2240. FIG. 22B also shows the profile 2220 with ribs 2230, 2232, 2234 which is accommodated by the cuts on the nozzle part 2200 and the finger/folding part 2240. In one implementation, the cuts are made on the finger/folding part 2240 to provide extra force when bending.

Figure 23:
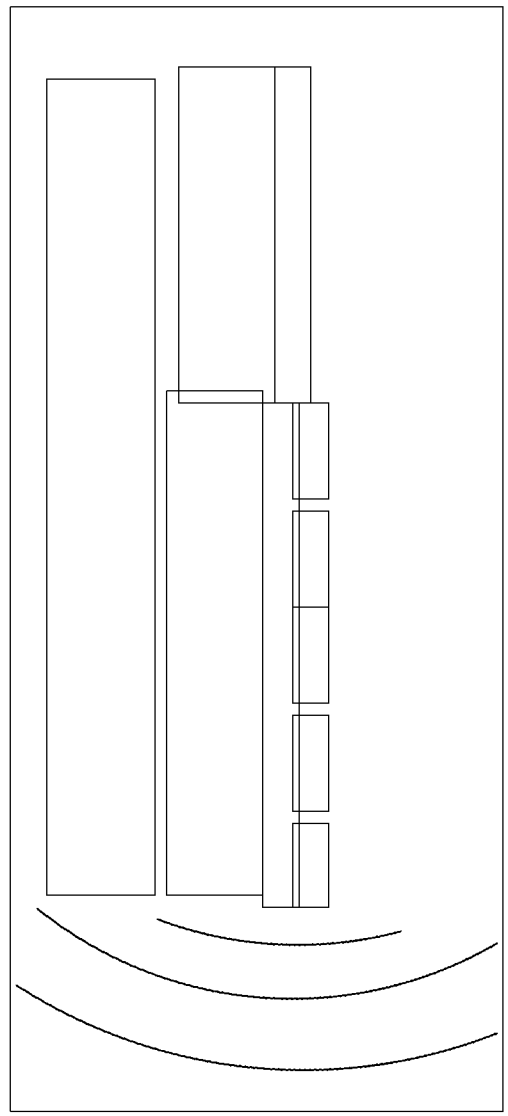
FIG. 23 is a perspective view of the nozzle part with a replaceable lower portion shown in FIG. 22A and FIG. 22B.

FIG. 23 is a perspective view of the nozzle part with a replaceable lower portion shown in FIG. 22A and FIG. 22B. As shown in FIG. 23, the lower portion of the nozzle part can be interchanged without removing the entire nozzle part.

Figure 24A:
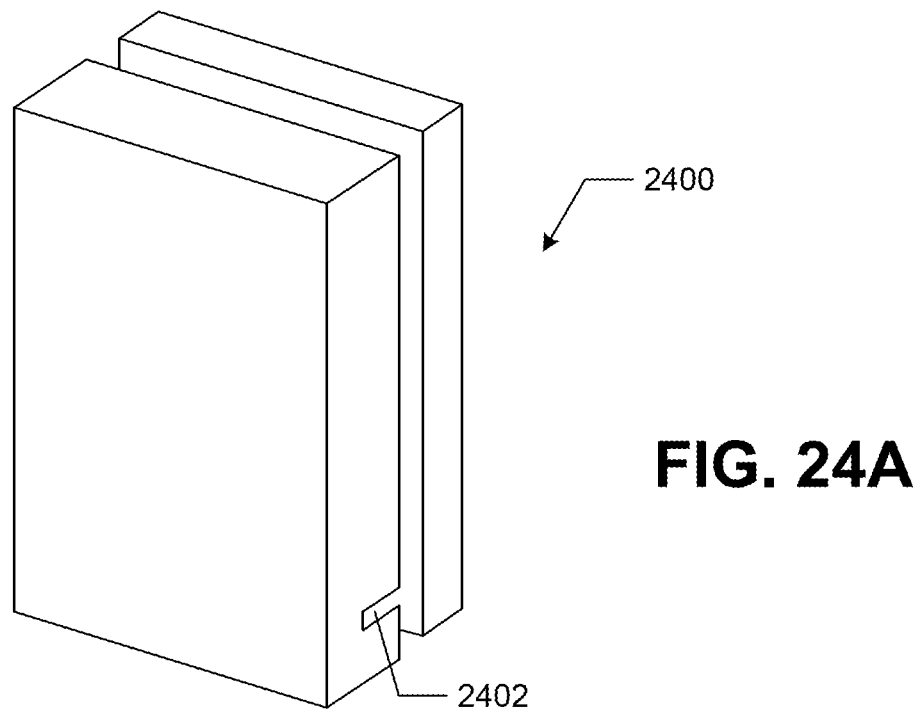
FIG. 24A is a perspective view of a nozzle part of the bending unit in accordance with another implementation of the present disclosure.

FIG. 24A is a perspective view of a nozzle part 2400 of the bending unit 140 in accordance with another implementation of the present disclosure. In FIG. 24A, the nozzle part 2400 is configured to receive a rule rather than a profile.

Figure 24B:
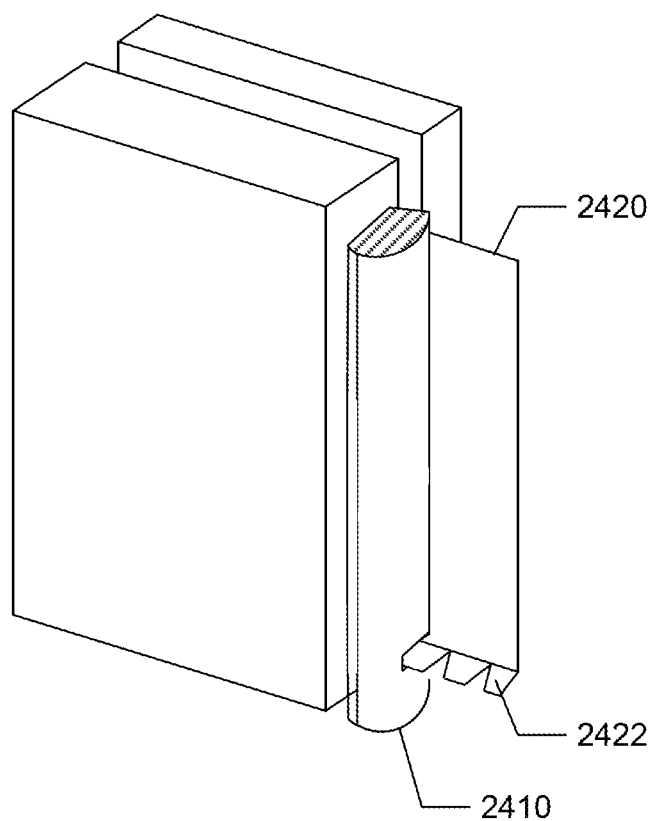
FIG. 24B shows a corresponding cut (corresponding to the cut made on the nozzle part as shown in FIG. 24A) made on the finger/folding part.

FIG. 24B shows a corresponding cut (corresponding to the cut 2402 made on the nozzle part as shown in FIG. 24A)

made on the finger/folding part 2410. FIG. 24B also shows the rule 2420 with a flange 2422 which is accommodated by the cut on the nozzle part 2400 and the finger/folding part 2410.

Figure 25:
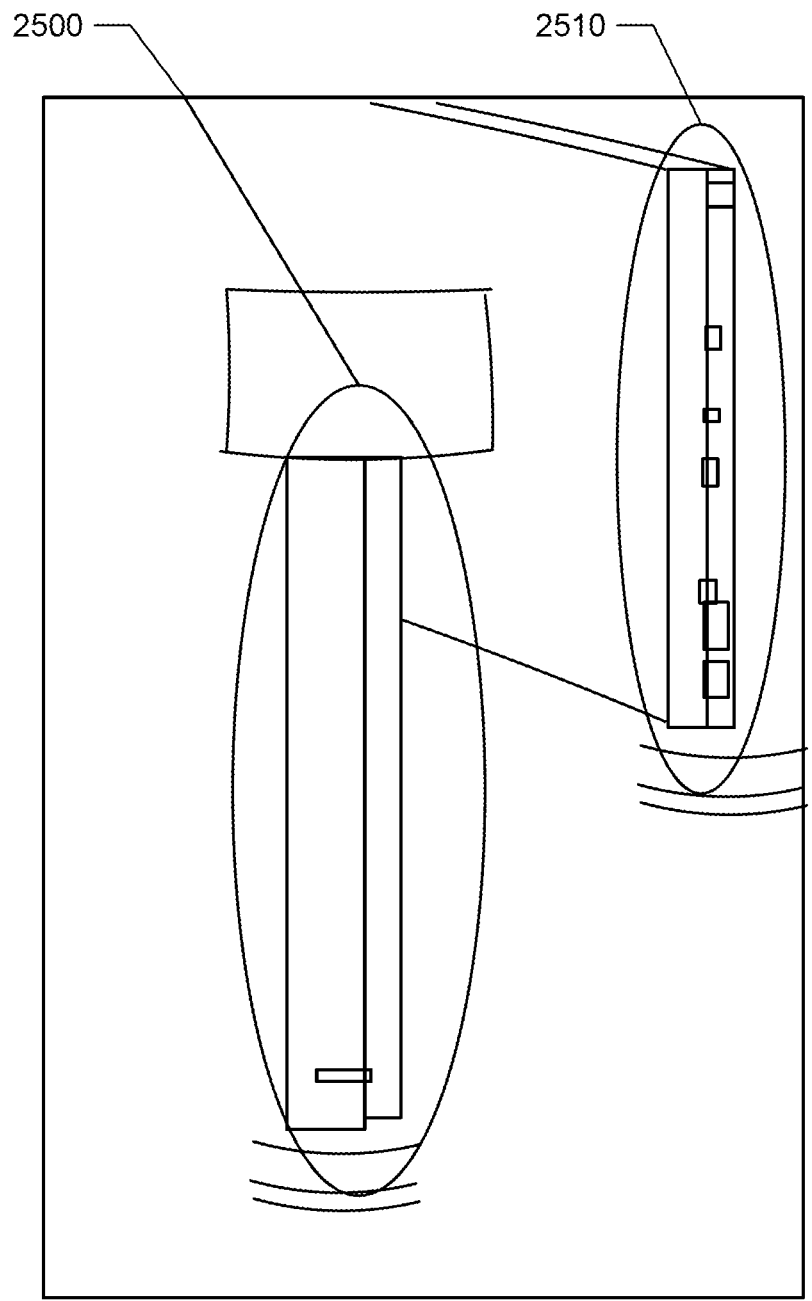
FIG. 25 is a perspective view of two different nozzle parts which are interchangeable.

FIG. 25 is a perspective view of two different nozzle parts which are interchangeable. Thus, in FIG. 25, for bending rules that have flanges, the nozzle part 2500 shown in the front is used, and for bending profiles with ribs, the nozzle part 2510 shown in the back is used.

Figure 26A:
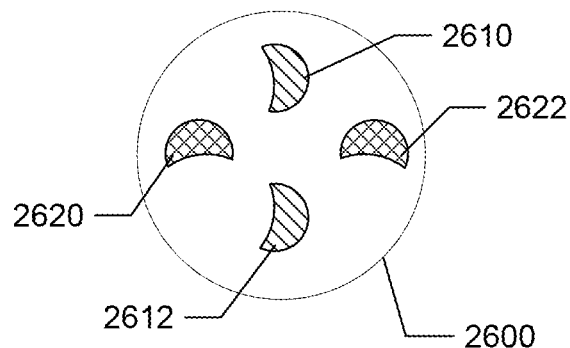
FIG. 26A shows one configuration of the finger/folding part having four fingers, two for one type of channels (e.g., for rules with flanges) and two for another type of channels (e.g., for profiles with ribs)

FIG. 26A shows one configuration of the finger/folding part 2600 having four fingers, two 2610, 2612 for one type of channels (e.g., for rules with flanges) and two 2620, 2622 for another type of channels (e.g., for profiles with ribs). In some implementations, more fingers can be used for more than two types of channels.

Figure 26B:
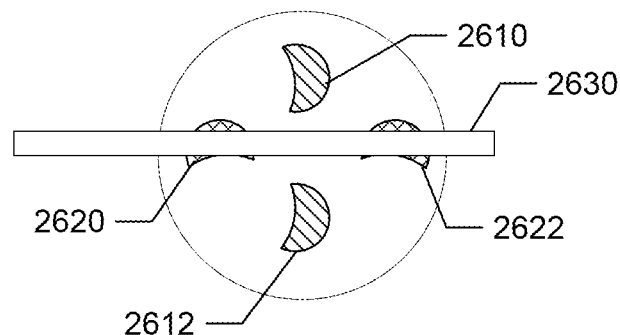
FIG. 26B shows a channel material to be bent being guided between the two fingers that are in operation.

FIG. 26B shows a channel material 2630 to be bent being guided between the two fingers 2610, 2612 that are in operation. In this configuration, the two operational fingers 2610, 2612 would be raised when the finger is to be used to bend the channel material 2630, while the two non-operational fingers 2620, 2622 would remain in a down position.

Figure 26C:
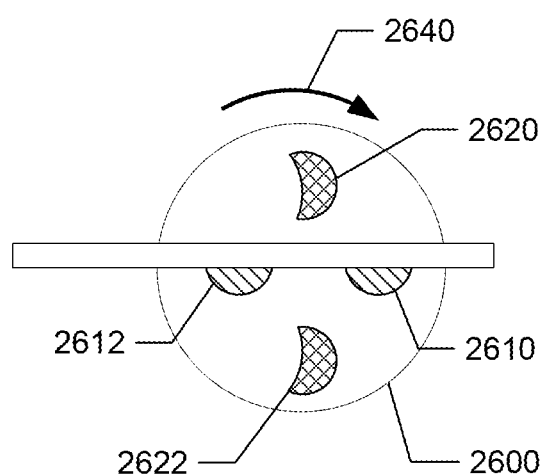
FIG. 26C shows another configuration of the finger/folding part rotated to change the operational fingers.

FIG. 26C shows another configuration of the finger/folding part 2600 rotated 2640 to change the operational fingers. Thus, in the configuration of FIG. 26C, fingers 2620, 2622 are configured to be operational, while fingers 2610, 2612 are configured to be non-operational.

Figure 27A:
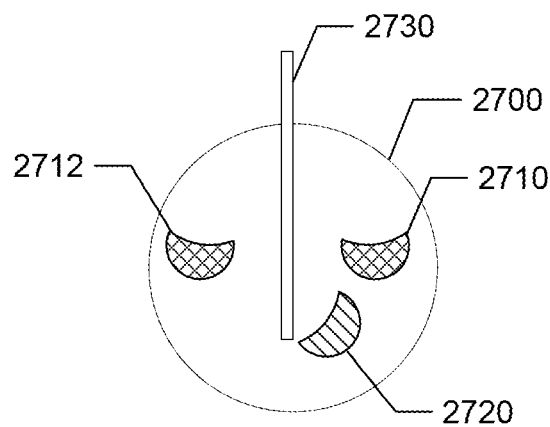
FIG. 27A show another configuration of the finger/folding part having three fingers in accordance with one implementation of the present disclosure.

FIG. 27A show another configuration of the finger/folding part 2700 having three fingers in accordance with one implementation of the present disclosure. In the illustrated implementation of FIG. 27A, two fingers 2710, 2712 are configured to be used for bending the channel material 2730 (e.g., a rule or profile) and one 2720 finger is configured to be used for cutting. Using one of the fingers to cut the channel material rather than using a cutting device saves the cost of installing the cutting device. By making a deep broaching mark using a broaching unit (e.g., a first or second broaching unit), a cut of the channel material can be made with a quick push on the channel material using the cutting finger.

Figure 27B:
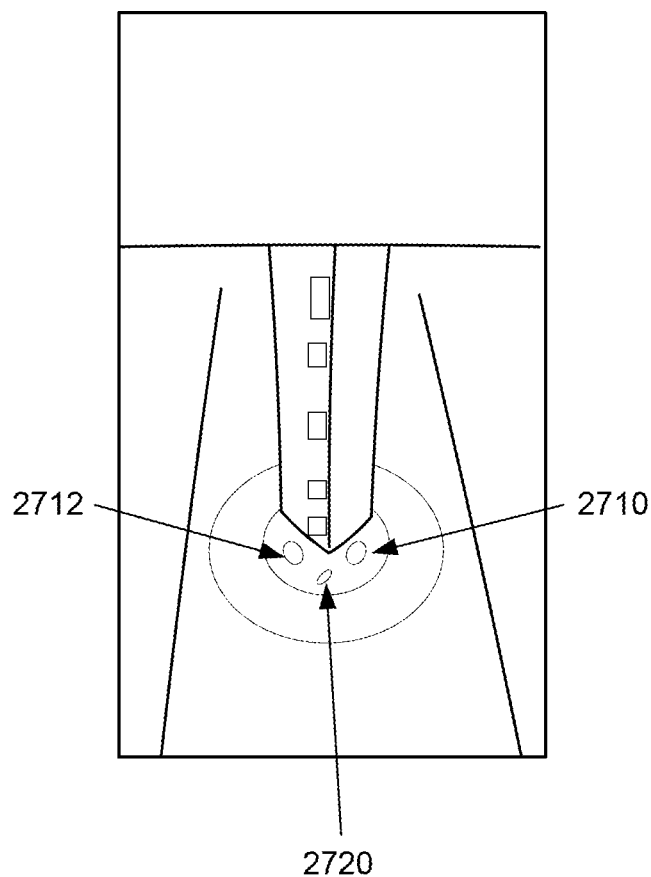
FIG. 27B is a perspective view of the configuration of the finger/folding part having three fingers shown in FIG. 27A.
Figure 28A:
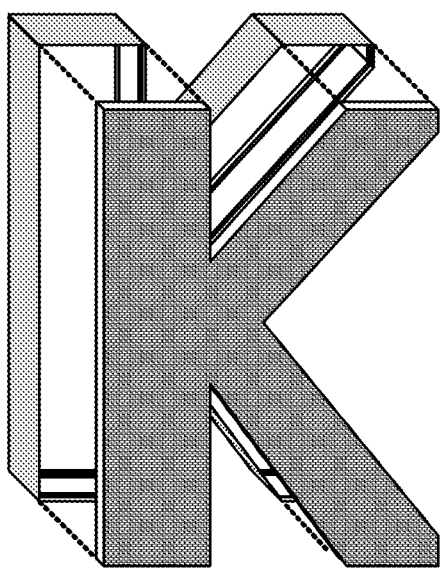
Figure 28B:
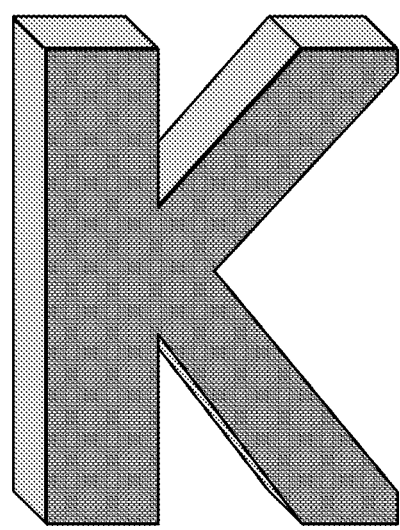

FIG. 27B is a perspective view of the configuration of the finger/folding part 2700 having three fingers shown in FIG. 27A.

The apparatus, devices, and methods described in conjunction with FIG. 1 through FIG. 27B enable a channel letter to be easily assembled. For example, FIG. 28A to FIG. 28E show a process of making a channel letter "K" using a profile after the channel bender was used to bend the profile into the letter shape. Once the letter shape is finished, the top plate is cut into the letter shape as well and is attached to the channel letter. The tape can be used to keep the top plate in place while the back side of top plate can be bonded to the rib with an adhesive.

The above descriptions of the disclosed embodiments are provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it will be understood that the description and drawings presented herein represent embodiments of the disclosure and are therefore representative of the subject matter which is broadly contemplated by the present disclosure. It will be further understood that the scope of the present disclosure fully encompasses other embodiments that may become obvious to those skilled in the art and that the scope of the present disclosure is accordingly limited by nothing other than the appended claims.

Accordingly, the foregoing embodiments are merely presented as examples and are not to be construed as limiting the present disclosure. The present teachings can be readily applied to other types of apparatus and/or devices. The description of the present disclosure is intended to be illustrative, and not to limit the scope of the claims. Many alternatives, modifications, and variations will be apparent to those skilled in the art.

What is claimed is:

1. A channel bender, comprising:
   a feeding unit configured to feed a channel material into the channel bender;
   at least one broaching unit configured to perform at least one of bite broaching and wheeled broaching on the channel material to make at least one broaching mark,
   wherein the at least one broaching unit comprises: a first broaching unit configured to perform bite broaching; and a second broaching unit configured to perform wheeled broaching,
   wherein the first broaching unit includes a plurality of sections, each section of the plurality of sections having a different height and roughness from other sections of the plurality of sections; and
   a bending unit configured to bend the channel material that includes the at least one broaching mark.

2. The channel bender of claim 1, each section has progressively increasing or decreasing height and roughness.

3. The channel bender of claim 1, wherein the second broaching unit includes
   a plurality of wheels, wherein each wheel of the plurality of wheels is configured with a different broaching angle from other wheels of the plurality of wheels so that each wheel makes a different broaching angle on one of the at least one broaching mark.

4. The channel bender of claim 3, further comprising
   a plurality of cylinders corresponding to the plurality of wheels,
   wherein each cylinder is configured to push a corresponding wheel of the plurality of wheels forward for the wheeled broaching.

5. The channel bender of claim 4, further comprising
   a rotary motor configured to spin the corresponding wheel that is pushed forward by a selected cylinder.

6. The channel bender of claim 1, wherein the feeding unit includes
   a nozzle part configured to guide the channel material through the at least one broaching unit toward the bending unit.

7. The channel bender of claim 6, wherein the bending unit includes
   a folding part configured to fold the channel material received from the nozzle part of the feeding unit.

8. The channel bender of claim 7, wherein the folding part includes a plurality of fingers.

9. The channel bender of claim 8, wherein one of the plurality of fingers is configured to cut the channel material.

10. A channel bender, comprising:
    a feeding unit configured to feed a channel material into the channel bender;
    at least one broaching unit configured to perform at least one of bite broaching and wheeled broaching on the channel material to make at least one broaching mark, wherein the at least one broaching unit comprises: a first broaching unit configured to perform bite broaching; and a second broaching unit configured to perform wheeled broaching, wherein the second broaching unit includes a plurality of wheels, wherein each wheel of the plurality of wheels is configured with a different broaching angle from other wheels of the plurality of wheels so that each wheel makes a different broaching angle on one of the at least one broaching mark; and a bending unit configured to bend the channel material that includes the at least one broaching mark.

11. A method to bend a channel material, the method comprising:

feeding the channel material;

performing at least one of bite broaching and wheeled broaching on the channel material to make at least one broaching mark, wherein the wheeled broaching includes using a plurality of wheels configured with different broaching angles so that the plurality of wheels makes different broaching angles on the at least one broaching mark; and bending the channel material that includes the at least one broaching mark.

12. The method of claim 11, further comprising:

selecting a wheel from the plurality of wheels depending on a desired broaching angle; and pushing the selected wheel forward for the wheeled broaching.

* * * * *